United States Patent [19]

Moretti

[11] Patent Number: 5,205,313
[45] Date of Patent: Apr. 27, 1993

[54] DISPENSING DEVICES WITH MULTIPLE-WAY TAP

[75] Inventor: Giovanni Moretti, Recanati, Italy

[73] Assignee: Telma Guzzini S.r.l., Montelupone, Italy

[21] Appl. No.: 797,976

[22] Filed: Nov. 26, 1991

[30] Foreign Application Priority Data

Dec. 5, 1990 [IT] Italy ............................. 22300 A/90
May 31, 1991 [IT] Italy ....................... MI91 A 001498

[51] Int. Cl.<sup>5</sup> ......................................... F16K 11/22
[52] U.S. Cl. ...................................... 137/112; 137/606
[58] Field of Search ............... 137/606, 607, 111, 112, 137/113, 240, 119

[56] References Cited

U.S. PATENT DOCUMENTS

| | | | |
|---|---|---|---|
| 2,382,912 | 8/1945 | Richards | 137/112 |
| 2,518,894 | 8/1950 | Humbarger et al. | 137/113 |
| 2,636,653 | 4/1953 | Stams | 137/112 |
| 3,533,431 | 10/1970 | Kuenzel | 137/113 |
| 3,550,613 | 12/1970 | Barber | 137/113 |
| 3,612,086 | 10/1971 | Roth | 137/87 |
| 3,770,012 | 11/1973 | Bitzer et al. | 137/119 X |
| 3,968,816 | 7/1976 | Tagansky | 137/606 |

Primary Examiner—Stephen M. Hepperle
Attorney, Agent, or Firm—Jacobson, Price, Holman & Stern

[57] ABSTRACT

A device (10) for dispensing water from at least one delivery outlet (25) has a first tap device (19) for manually controlling the delivery from the outlet (25) of fluid flowing from a first source (22) and a second tap device (13) for manually controlling the delivery from the outlet (25) of fluid flowing from a second source (15, 16). At least the first tap device (19) is operatively connected to a cutoff device (30, 31, 32, 33, 402) for inhibiting delivery of fluid from the second source (15) when the first tap device (19) is operated to deliver fluid from the first source (22).

27 Claims, 6 Drawing Sheets 5,205,313

DISPENSING DEVICES WITH MULTIPLE-WAY TAP

FIELD OF THE INVENTION

This invention relates to a water selecting/dispensing device which can be positioned on the edge of a wash-basin or the like.

BRIEF SUMMARY OF THE INVENTION

It is an object of this invention to provide a dispensing device whereby it is possible to select in a reciprocally exclusionary fashion the delivery between at least one source of treated water and mixable sources of hot and cold water, while avoiding possible mixing between the treated water and the hot and cold water. This object is achieved according to the invention by providing a device for dispensing water from at least one delivery outlet, comprising first means for manually controlling the delivery from the outlet of water flowing from first sources, and second means for manually controlling the delivery from the outlet of water flowing from second sources, characterized by the fact that at least the first means are operatively connected to cutoff means inhibiting delivery from the second means when the first means are made to deliver water from their respective sources.

BRIEF DESCRIPTION OF THE DRAWINGS

The innovative principles of this invention and its advantages with respect to the known technique will be more clearly evident from the following description of possible exemplary and non-restrictive embodiments applying such principles, with reference to the accompanying drawings, wherein:

FIG. 8 is a cross-sectional view taken along line VIII—VIII in FIG. 6;

DETAILED DESCRIPTION

Figure 1:
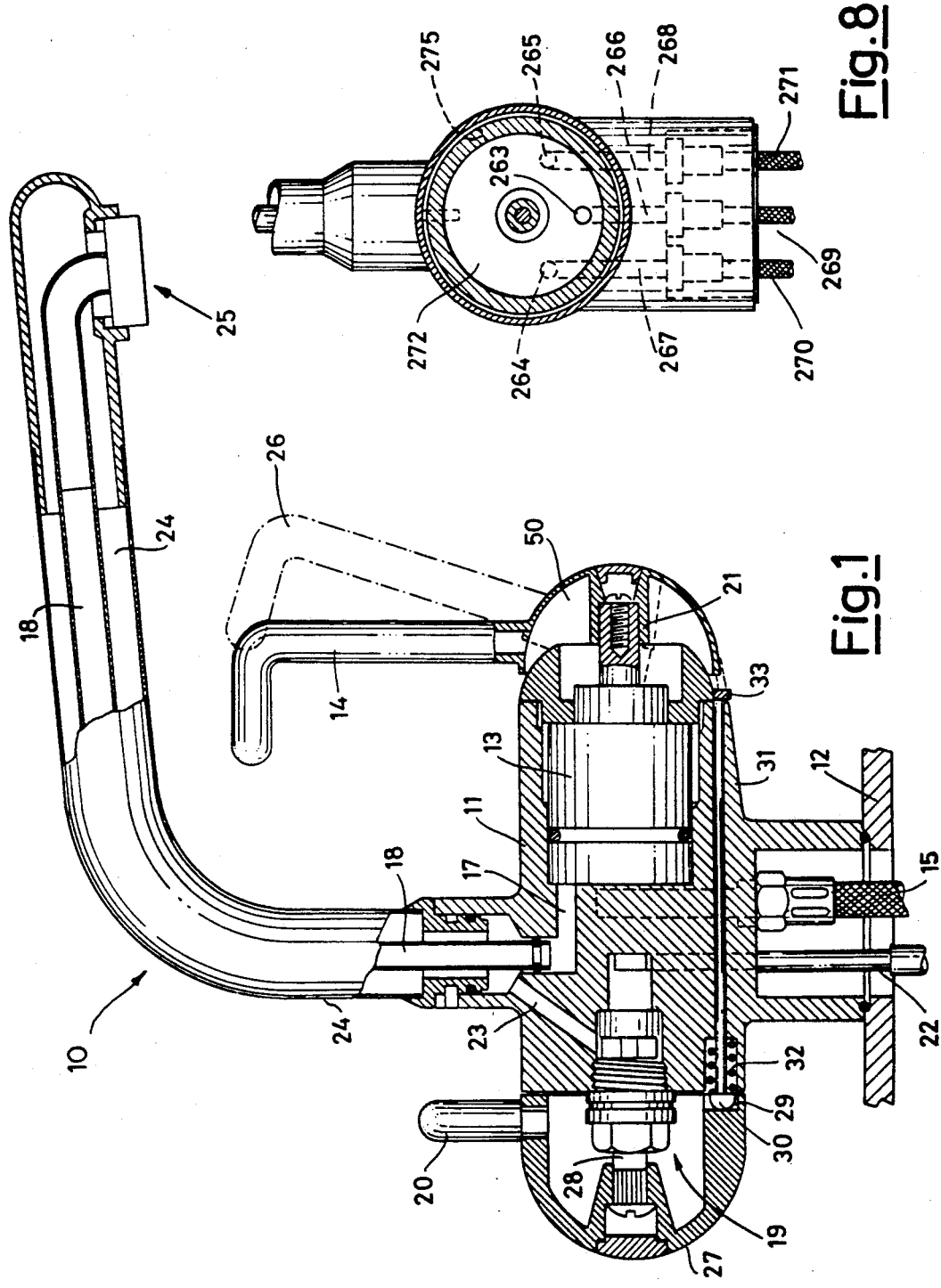
FIG. 1 is a schematic cross-sectional and partially cutaway view of a first tap embodiment made according to this invention.
Figure 2:
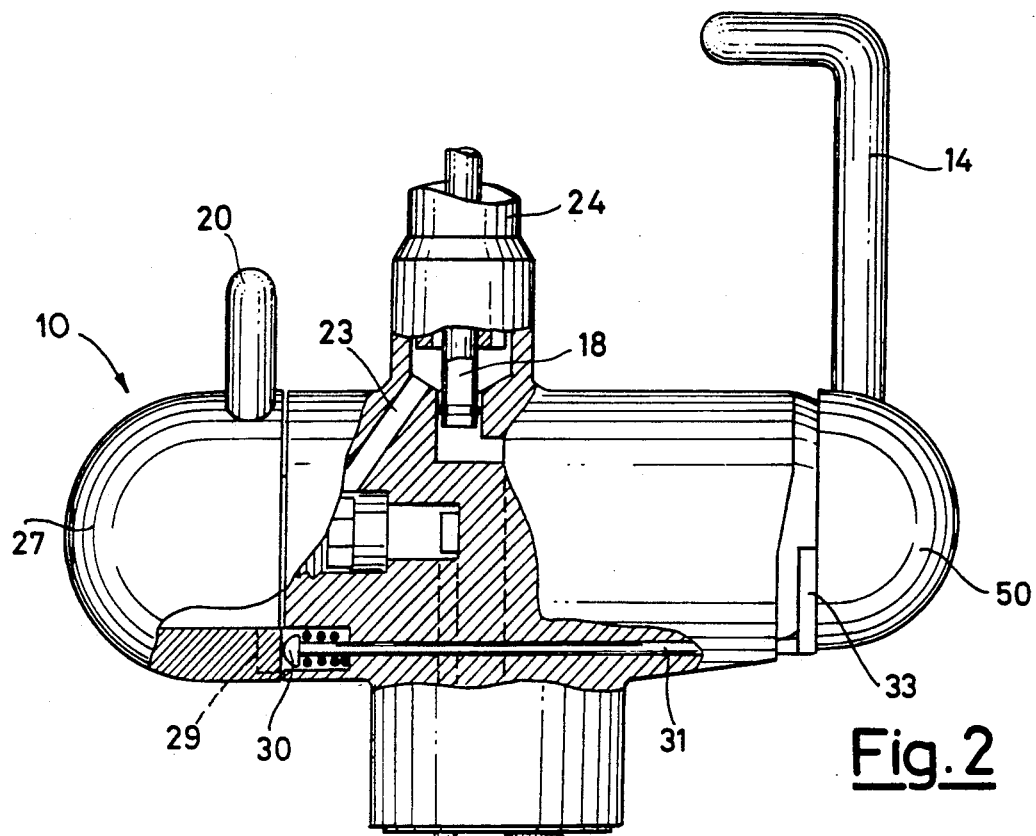
FIG. 2 is a partially cutaway side elevational view of the tap of FIG. 1 operated.
Figure 3:
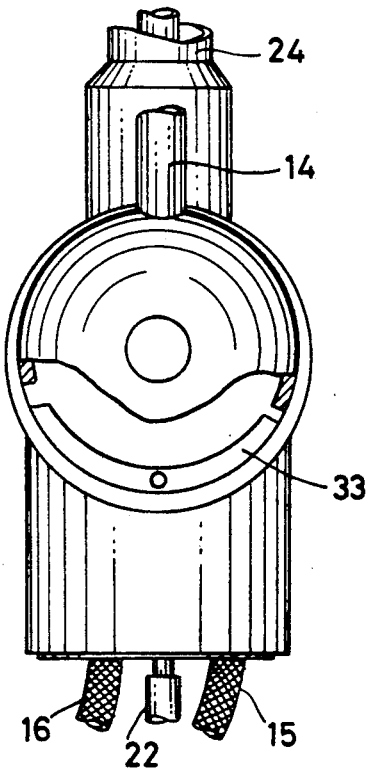
FIG. 3 is a partially cutaway front view of the device of FIG. 1.

With reference to the figures, a tap made according to the invention is shown in FIGS. 1, 2, 3 and is generically indicated by reference 10. The tap comprises a body 11 secured from below to a surface 12, for example the edge of a wash-basin.

The body 11 comprises a housing designed to receive a single-control mixer cartridge 13, of known technique (for example of the type with ceramic disks, well-known by any technician expert in the field). The cartridge has a control pin 21 connected by means of a casing element 50, to an operating lever 14. The lever controls the delivery and adjusts the mixing of the water flowing from two inlets 15, 16 (FIG. 2) typically for hot water and cold water, respectively.

The water is turned on by slanting the lever 14 downward, in the plane of the drawing, (as shown by the broken line 26), while the mixing is regulated by rotating the lever around the axis of the pin 21. The outlet of the cartridge 13 is connected, by means of a duct 17, to a first delivery pipe 18.

In the opposite position with respect to the cartridge 13, the body 11 has a housing for a known screw-type tap 19, which is made to rotate by means of a lever 20 protruding radially from a casing element 27 keyed onto the pin 28 controlling the screw. The screw tap 19 has an inlet duct 22 connected to a source of treated water, for example purified. The outlet of the screw tap is connected, by means of a duct 23, to a delivery pipe 24 advantageously disposed concentric to the pipe 18. The pipes 18 and 24 then lead into a delivery outlet 25. The pipes 18 and 24, which are integral with each other, are preferably connected to the body 11 in a rotatable fashion with respect to their axis, so as to enable the outlet 25 to be oriented in a horizontal plane. The casing element 27 has a cam-shaped surface which acts on the head 30 of a pin 31 in order to push it, against the action of a spring 32, when the screw tap is turned on by shifting the lever 20 (as clearly shown in FIG. 2). As can be more clearly seen in FIG. 3, at its other end the pin 31 supports a "C"-shaped element 33 which constitutes a movable bearing surface for the edge of the casing element 50 integral with the lever 14. When the lever 20 is in the closed position, the element 33 is in the retracted position shown in FIG. 1, and the lever 14 can be freely shifted to operate the mixer cartridge 13. As shown in FIG. 2, when the lever 20 is rotated, the screw tap 19 opens and the cam surface 29 simultaneously pushes the pin 31, so that the element 33 comes to rest against the edge of the casing 50, thus preventing the lever 14 from shifting and consequently opening the mixer. Advantageously, whenever the tap 19 is closed and the mixer 13 is open, the subsequent opening of the tap 19 forces the element 33 to close the mixer. The extension of the C-shaped element 33 ensures interference with the casing 50 belonging to the lever 14. The lever has also been rotated around the axis of pin 21 in order to vary the mixing ratio between the sources 15 and 16.

It is clear, at this point, how the device 10 operates. By operating the lever 14, water flowing from the ducts 15 and 16 can be delivered from the outlet 25 mixed to any desired degree. Likewise, by operating the lever 20, water flowing from the duct 22 can be delivered from the outlet 25. Once the delivery of one of the two flows of water has begun, the presence of the mechanical stop, consisting of the pin 31 and the element 33, prevents the other from simultaneously being delivered. This arrangement, together with the fact that the paths of the two different flows of water fare completely separate, prevents any possibility whatsoever of them becoming mixed together.

In this way, the properties of the treated water (for example its purity) can in no way be altered by the water coming from the other ducts. The impossibility of even small quantities of liquid contained in the ducts of the delivery outlet becoming mixed is useful whenever the sources consist of liquids other than simply water, such as for example, soft drinks.

Figure 4:
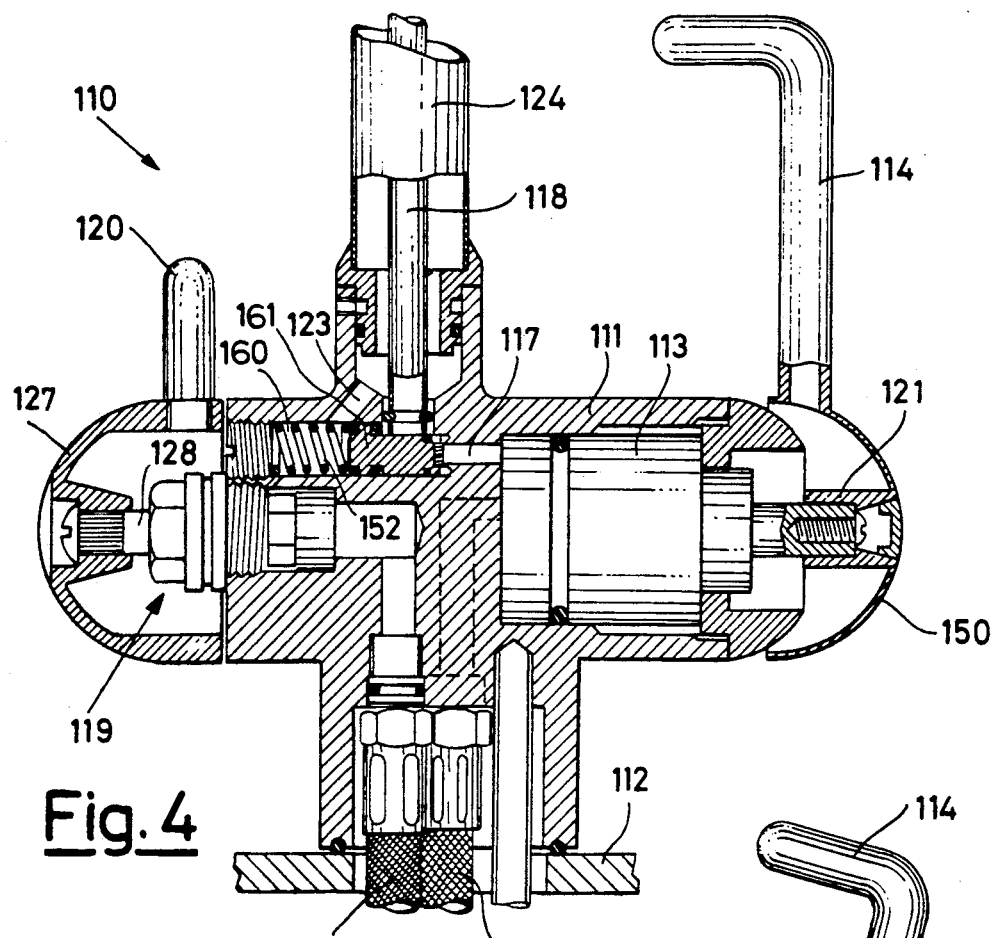
FIG. 4 is a view similar to FIG. 1 of a second embodiment of a tap made according to this invention.
Figure 5:
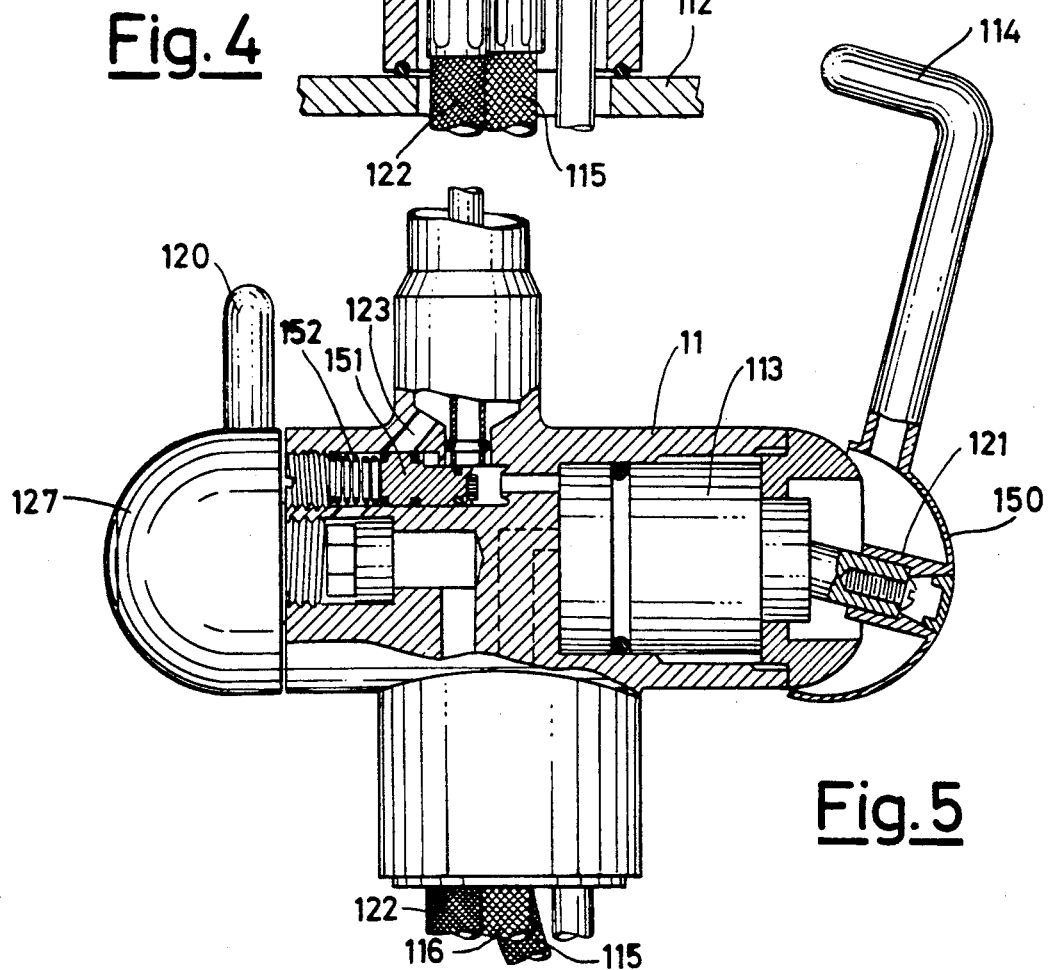
FIG. 5 is a view similar to FIG. 4 of the tap of FIG. 4 operated.

FIGS. 4 and 5 show a second embodiment of a tap according to the inspiring principles of this invention. This second embodiment 110 is substantially similar in structure to the previous embodiment 10 and maintains the same numbering as the latter preceded by the digit one, for the parts which remain substantially unchanged, and for which reference should be made to the foregoing description. The second embodiment is thus composed of a body 111 with housings designed to receive a mixing cartridge 113, operated by a lever 114 to mix and control the delivery of water flowing from ducts 115 and 116 (for example, hot and cold water ducts, respectively), and a screw-type tap 119, operated by a lever 120 to regulate the incoming flow of treated water (refrigerated, purified, etc.) from a duct 122.

Unlike the previous embodiment, the outlet ducts 117 and 123, from the mixer 113 and from the screw tap 119, respectively, pass through a chamber 150 within which is slidingly housed a piston 151, which moves against the action of a spring 152 to alternatively close the duct 117 or the duct 123 which penetrate into the chamber 160 on opposites sides of a piston 1616.

As shown in FIG. 4, the spring 162 exerts pressure on piston 161 to close the duct 117. When the screw tap 119 is opened the water flowing from the duct 122 can then flow through the ducts 123 and 124 towards a delivery outlet, not shown since it is essentially similar to the delivery outlet 25 of FIG. 1.

Conversely, when the mixer 113 is turned, on the water flowing from it, as shown in FIG. 5, forces the piston 161 to slide against the action of the spring, so as to open the duct 117 in the direction of the duct 118, which also communicates with the delivery outlet. The sliding movement of the piston simultaneously closes the duct 123, so that when the tap 119 is operated it prevents delivery of the corresponding water.

In this way a hydraulic lock is obtained which prevents the water flowing from the ducts 115, 116 (advantageously normal mains water) from being accidentally mixed with the treated water flowing from the duct 122.

Figure 6:
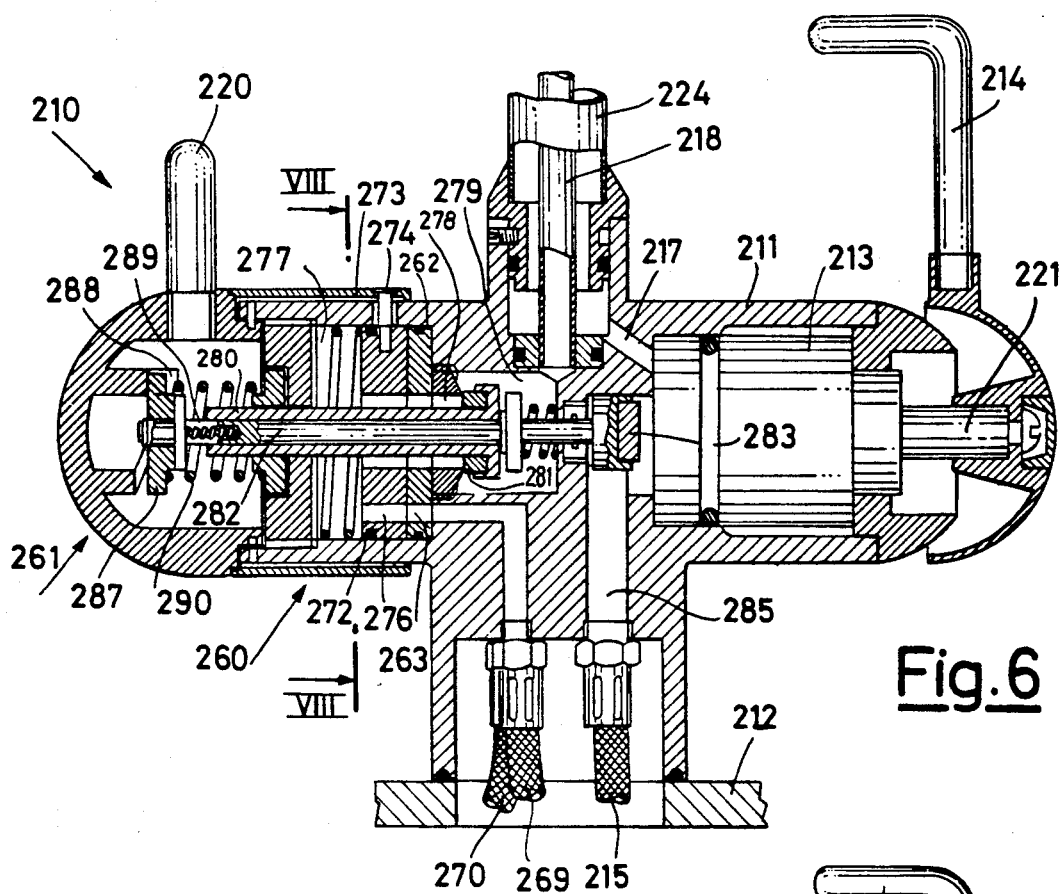
FIG. 6 is a view similar to FIG. 1 of a third embodiment of the tap made according to this invention.
Figure 7:
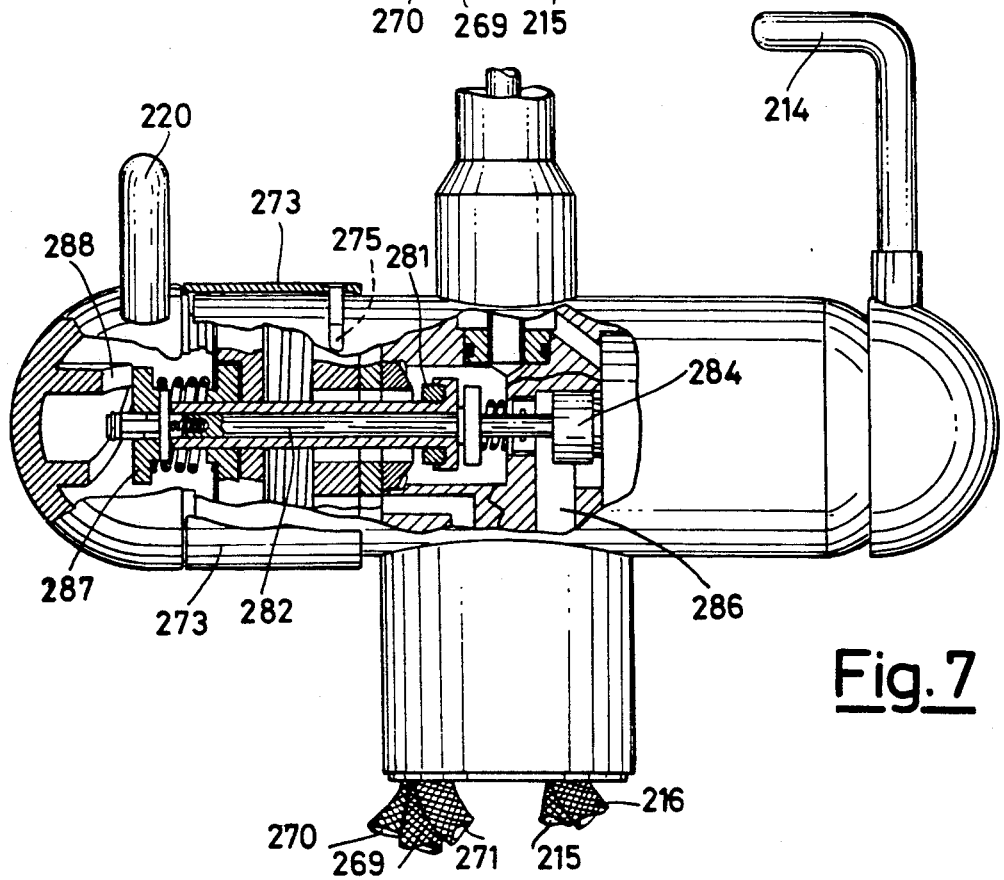
FIG. 7 is a view similar to FIG. 1 of the tap of FIG. 6 operated.

FIGS. 6-8 show a third embodiment applying the innovative principles claimed herein.

This embodiment, which is generically indicated by reference 210, comprises a body 211 with a housing designed to receive a mixing cartridge 213, operated by a lever 214 for mixing and controlling the delivery of water flowing from ducts 215 and 216 (for example, cold and hot water, respectively, from a water supply system), the mixed flow passes through ducts 217 and 224 and is then delivered from a delivery outlet, not shown, identical to the delivery outlet 25 of FIG. 1.

Disposed at the opposite end of the body 211 are a selector 260 and a delivery tap 261.

The selector 260 comprises a first fixed disk 262 having (as is more clearly shown in FIG. 8) a plurality of holes disposed along a circumference concentric to the disk. For example, there can be three holes, indicated in the figures by references 263, 264, 265, communicating by means of ducts 266, 267, 268 with their respective pipes 269, 270, 271 which supply treated water. The treated water can be, for example, purified and refrigerated water, purified water, and water containing carbon dioxide.

Disposed matching with one face of the disk 262 is a second disk 272 coaxial with the first and free to rotate around their common axis. The rotation of the disk 272 is controlled by an external ring nut 273 connected to it by means of a screw 274 sliding within a circumferentially extended slot 275, as can be clearly seen in FIG. 7. The disk 272 is traversed by a hole 276 which, on rotation of the disk is shifted to selectively match with one of the plurality of holes on the fixed disk 262. In this way, the selected duct (269, 270 or 271) communicates, through a chamber 277, with a duct 278 coaxial to the disks and ending in a chamber 279 connected to duct 218 leading to the delivery outlet.

Fitted to slide axially to the duct 278 is a hollow shaft 280 provided at one end with a plug 281 which intercepts the flow through the duct 278.

Sliding within the hollow shaft 280 is a shaft 282 which is divided at one end to simultaneously control a plug 283 which is actuated to close the inlet of the mixer 213 connected, through the duct 285, to the duct 215 and (as shown in FIG. 7) a plug 284 which is actuated to close the inlet of the mixer 213 connected, through a duct 286, to the duct 216.

At the opposite end to the plugs 283 and 284, the shaft 282 carries an element 287 which is made to slide axially, against the action of a spring 290, by the pressure exerted by a cam surface 288 operated by shifting a lever 220.

By compression of a spring 289, the movement of the element 287 is transmitted elastically to the shaft 282. In use, the mixer 213 can be operated by shifting the lever 214, similarly to the mixer 13 of the first embodiment.

When the lever 220 is shifted from the position shown in FIG. 6 to the position shown in FIG. 7, it initially shifts, by means of the spring 289, the shaft 282 so that the plugs 283, 284 cut off the flow of water to the mixer 213.

By continuing the rotational movement of the lever 220 the spring is compressed until the element 287 comes into contact with the hollow shaft 280 and forces it to open the duct 278, thus obtaining delivery of the water flowing from the duct (269, 270 or 271) which is selected by rotating the ring nut 273.

Figure 9:
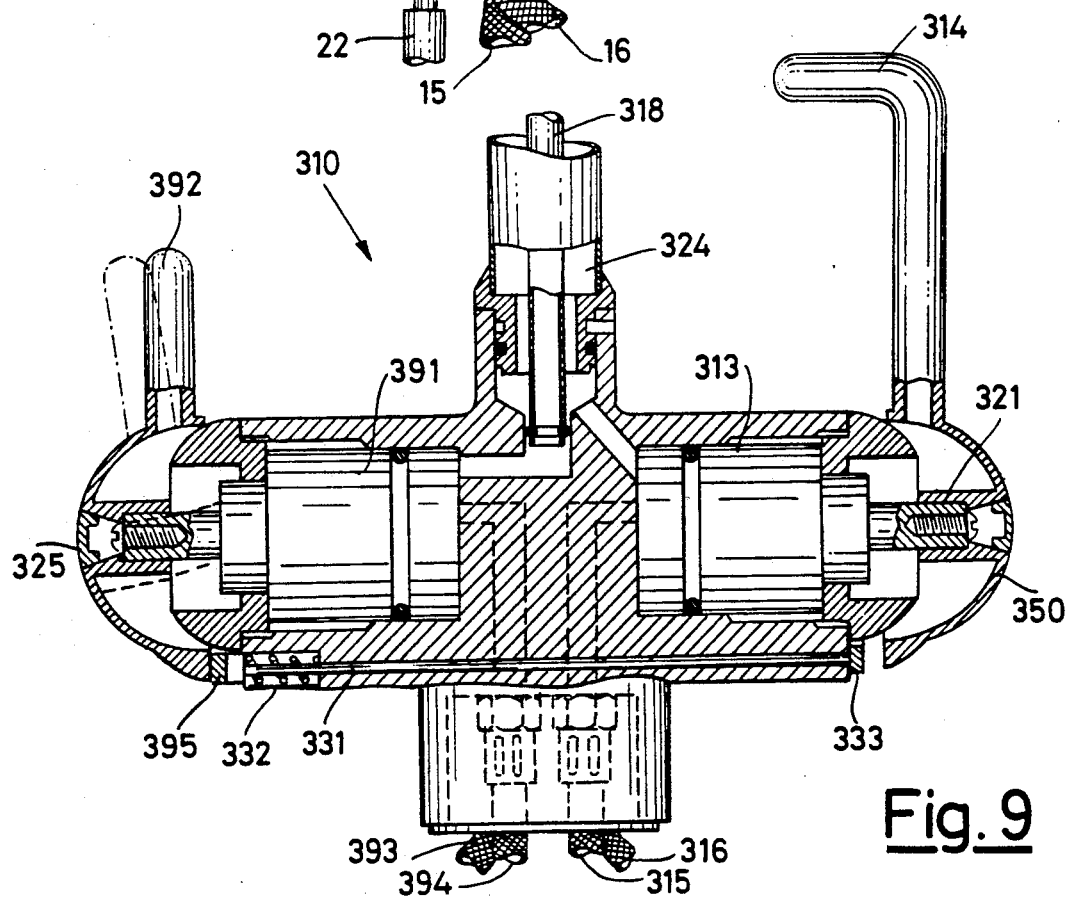
FIG. 9 is a view similar to FIG. 1 of another tap made according to this invention.

This ensures that, whenever the lever 220 is operated while water is being delivered through the mixer 213, the delivery from the mixer is automatically interrupted before the delivery controlled by the tap 261 begins. At the same time, whenever the tap 261 is open and the mixer 213 is turned on, no water will be delivered from the latter. This makes it impossible for the water coming from the two sets of ducts 215, 216 and 269, 271 to be mixed, even in the case of incorrect manipulation by the user. FIG. 9 shows a further example of a tap according to the invention. In this further embodiment, generically indicated by reference 310, the two sets of water to be kept separate from each other each comprise two sources consisting respectively of ducts 315, 316 and 393, 394. For example, the first can be connected to sources of hot water and cold water from the mains and the second can be connected to sources of purified water and refrigerated purified water.

The sources of the first set can be mixed by means of the mixer 313, by shifting the lever 314, while the sources of the second set can be mixed by means of the mixer 391, by a similar movement of slanting and rotating the lever 392. The outlets of the two mixers are connected to separate delivery ducts, indicated by references 318 and 324, respectively, which lead into a delivery outlet which is similar to the outlet 25 of FIG. 1 and therefore not shown.

When the lever 392 is slanted, to open the mixer 391, it pushes the edge of the casing element 327 against a C-shaped element 395, substantially identical to the element 33 of FIG. 3. In this way, a pin 331 connected to it is made to slide, against the action of a spring 332, so as to in turn push a C-shaped element 333 against the edge of the casing element 350. As a result, if the mixer 314 was open it is closed by the thrust of the element 333. Similarly, if the mixer 313 is opened when the mixer 391 is open, the latter is closed by the thrust of the element 395 against the edge of the casing 327, thus preventing the simultaneous operation of both mixers, which would result in the mixing of their respective flows of water.

Figure 12:
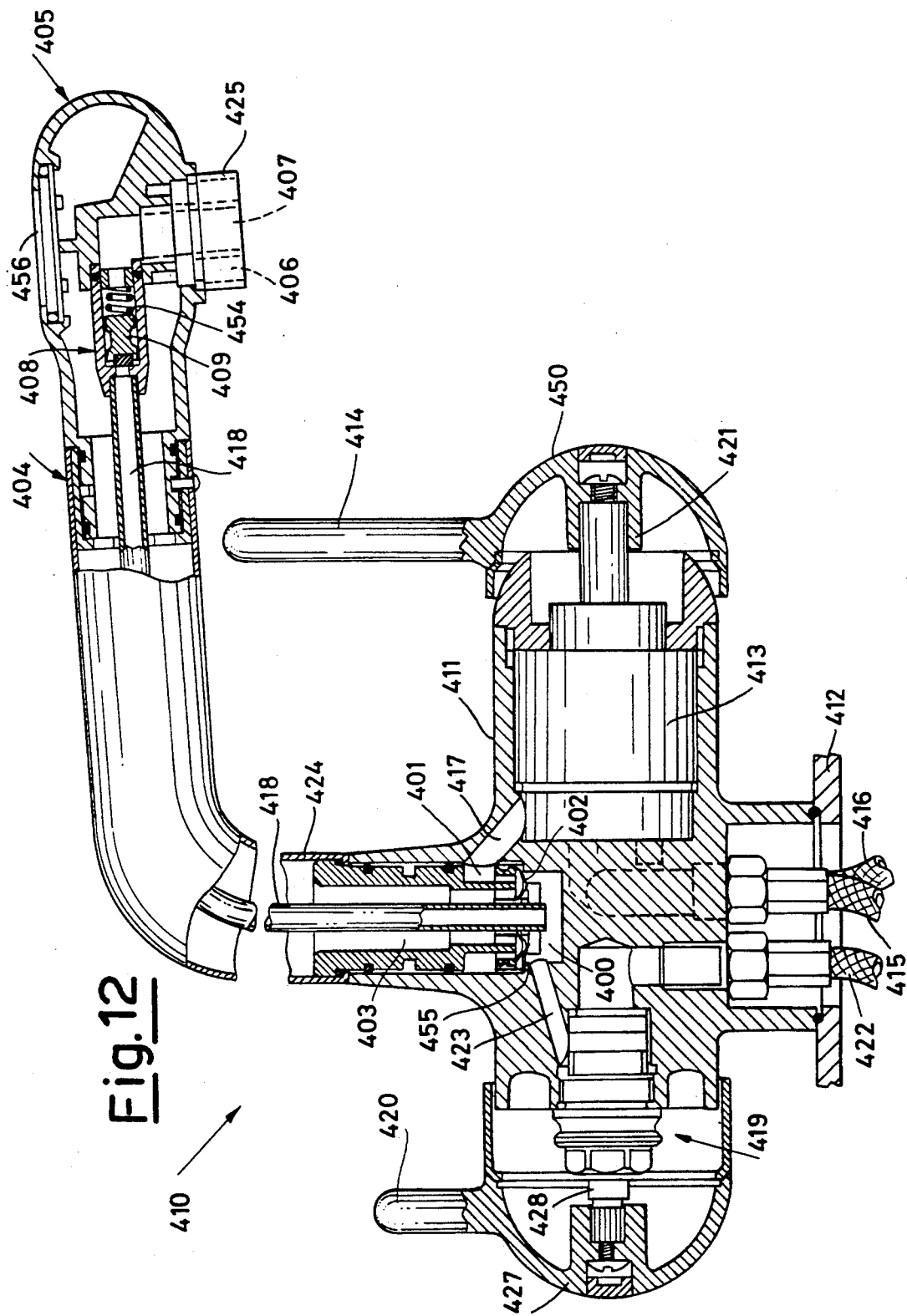
FIG. 12 is a view similar to FIG. 1 of a further embodiment of a tap made according to this invention.

In FIG. 12 is shown a further tap made according to the invention, and generically indicated by 410, comprising a body 411 secured from below to a surface 412, for example to edge of a wash-basin. The body 411 in turns comprises a housing designed to receive a single-control mixer cartridge 413, of known technique (for example of the type with ceramic disks, well-known by any technician expert in the field). The cartridge has a control pin 421 connected, by means of a casing element 450, to an operating lever 414. By rotating and slanting the lever 414 with respect to the axis of the cartridge it is thus possible to control the delivery and adjust the mixing of the water flowing from two inlets 415, 416, typically for hot water and cold water, respectively.

In the opposite position with respect to the cartridge 413, the body 411 has a housing for a known screw-type tap 419, which is made to rotate by means of a lever 420 protruding radially from a casing element 427 keyed onto the pin 428 controlling the screw. The screw tap 419 has an inlet duct 422 connected to any known source of treated water, for example purified, and an outlet connected, by means of a duct 423, to a chamber 400 which leads off into a first delivery pipe 418.

An annular diaphragm 402 surrounds the pipe 418 and hermetically separates the chamber 400 from a second chamber 401 which leads off into a tubular element 403 connected to a second pipe 424. A duct 417 connected to the mixed outlet of the cartridge 413 also leads into the chamber 401.

The pipes 424 and 418 are advantageously integrally and concentrically disposed so that their other ends open out into a delivery head 405 and are preferably connected to the body 411 in an axially rotating fashion, so as to enable the head to be oriented in a horizontal plane. The delivery head 405, which is advantageously axially rotatable with respect to the ducts 418 and 424 thanks to an airtight rotary coupling 404, comprises a delivery outlet 425 with a first passage 406 directly connected to the pipe 424. A second passage 407, coaxial to the first, is connected to the pipe 418 by means of a valve unit 408 comprising a piston 409 biased by a spring 454 to tightly close the mouth of the duct 418. The delivery head is advantageously fitted with a liquid crystal thermometer 456 in contact with the water dispensed by the mixer, so as to give an indication of its temperature.

To use, let us assume that the lever 420 is operated so as to open the screw tap 419. The treated water arriving from the duct 422 will begin to flow into the duct 418 until it reaches the valve unit 408. The ratio between the flexibility of the diaphragm and the thrust of the spring is such that the pressure of the water flowing from the screw tap will first flex the diaphragm 402 and then the piston 409 will move against the action of the spring 454. Thus, before the water begins to flow from the outlet 425, the diaphragm flexes and comes to rest tightly against the edge 455 of the element 403 thereby closing the passage between chamber 401 and pipe 424.

If at this point we were to open the mixer tap 413, the delivery of mains water from the ducts 415 and 416 would be prevented because the diaphragm 402 prevents it from flowing between duct 417 and pipe 424. It should be noted that the area of the diaphragm affected by the pressure of the treated water in the chamber 400 is double compared to the area of diaphragm affected by the pressure of the mains water in the chamber 401. Consequently, although the pressure of the different flows of water is the same, the water arriving from the duct 423 will always take precedence in the delivery. Therefore, whenever only the mixer tap 413 is opened the mains water is immediately delivered from the outlet 425, but if then the tap 419 is opened the diaphragm closes the passage between chamber 401 and pipe 424, impeding the flow of mains water, and the treated water is then delivered.

This arrangement, together with the fact that the paths of the different flows of water are completely separate, prevents any possibility whatsoever of them becoming mixed together.

In this way, the properties of the treated water (for example its purity) can in no way be altered by the water coming from the other ducts. The impossibility of even small quantities of liquid contained in the ducts of the delivery out let becoming mixed is useful whenever the sources consist of liquids other than simply water, such as for example, soft drinks.

The operating features described above are obviously identical also when the pressure of the incoming water in the two circuits differs, within certain limits. In fact, in the worst of hypotheses, that is when the inlet pressure of the treated water is lower than the inlet pressure of the mains water, it should be borne in mind that whereas the water flowing through the duct 403 to the outlet encounters practically no resistance, the water flowing through the duct 418 encounters the resistance of opening the valve 408, and to this is added the different area of the diaphragm affected by the pressure of the two sources of water.

Figure 10:
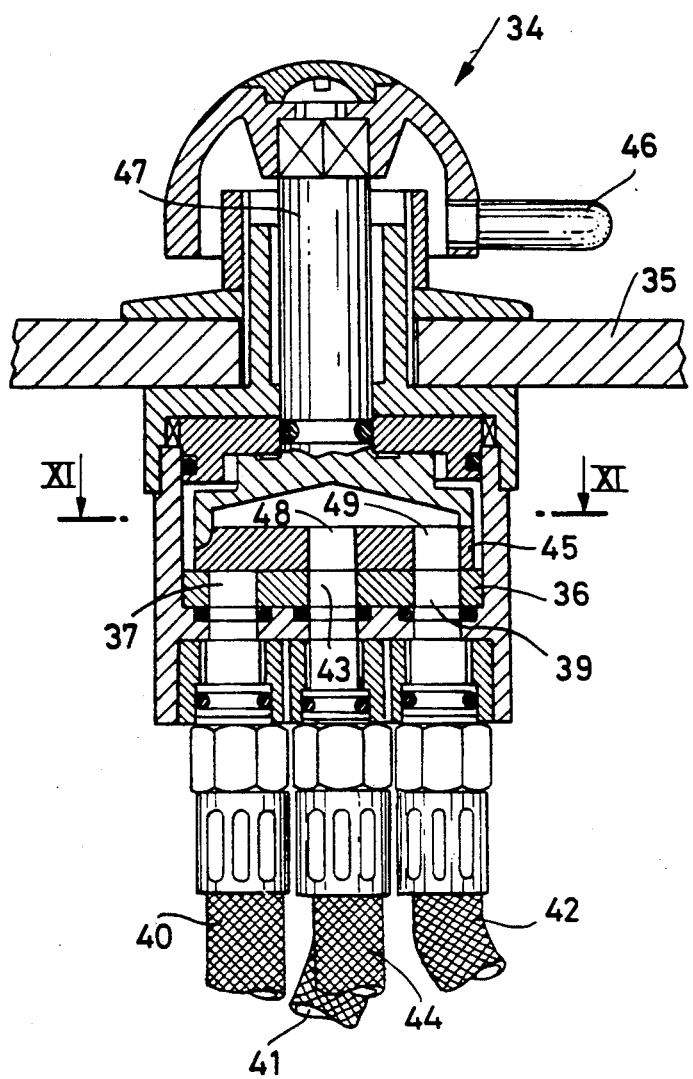
FIG. 10 is a schematic cross-sectional view of a selector applicable to the taps mentioned previously.
Figure 11:
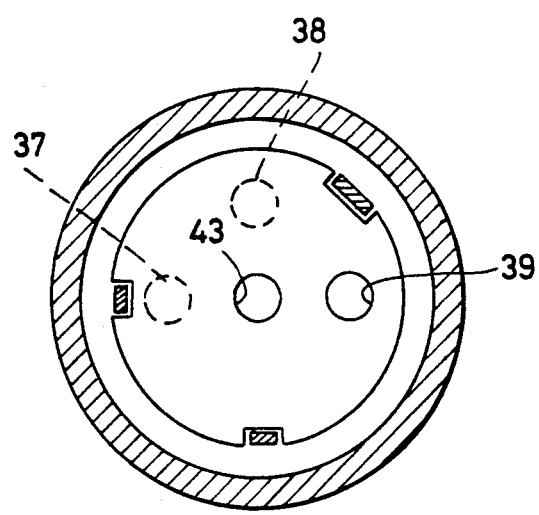
FIG. 11 is a cross-sectional view taken along line XI—XI of FIG. 10.

Should it be desired to be able to choose from a wider range of sources, FIGS. 10 and 11 show a selector which can be connected to an inlet duct of the previous embodiments and, in particular, to duct 22 or 122 of the embodiments shown in FIGS. 1-3 and 4-5, respectively. This selector, which is generically indicated by reference 34, can be fitted into a surface 35, for example the edge of a wash-basin, and internally comprises a first fixed disk 36 with peripheral holes 37, 38, 39 connected respectively to inlet ducts 40, 41, 42 supplying water from different sources. The fixed disk 36 is also provided with an axial hole 43 connected to an outlet duct 44. Disposed matching with the disk 36 is a second disk 45 which can be rotated on its axis by means of an external control lever 46 which turns a shaft 47 coupled to the disk. The movable disk 45 has a hole 48 coaxial to the central hole 43 of the first disk and a peripheral hole 49 selectively matching with one of the peripheral holes in the fixed six 36.

Thus, by rotating the control lever 46 it is possible to connect one of the sources 40, 41, 42 to the outlet duct 44 which, when connected to the inlet duct of one of the previously described embodiments, supplies it alternatively with water.

It is thus possible, for example with the embodiments of FIGS. 1, 4, 12, for the control 20, 120, 420 to enable delivery from several sources by selection control by means of the device 34.

It will be obvious at this point that the intended object of the invention are achieved by providing a tap-operated dispensing device for delivering water from different sources, while avoiding any possibility of undesirable mixing. The foregoing description of an embodiment applying the innovative principles of this invention is given by way of example in order to illustrate such innovative principles and should not therefore be understood as a limitation to the scope of the invention claimed herein. For example, the taps shown may also differ in shape in order to adapt to particular aesthetical or structural requirements.

Moreover, even though the two delivery pipes are shown concentric, it will be obvious to any technician that it is also possible to obtain an embodiment with pipes disposed side by side or a single pipe divided by a longitudinal internal diaphragm.

If complete separation of the paths for the water flowing from the two sets of sources connected to the two controls on the tap is not required, a single pipe can obviously be used.

It will also be obvious to any technician that it is possible, in the embodiment shown in FIGS. 1-3, to position the pin 31 biased elastically to the right, so that the movement of opening the lever 14 shifts the pin 31 towards the left to engage it in a housing in the element 27 thereby preventing it from rotating. Thus, contrarily, the movement of the lever 20 prevents the pin 31 from engaging in said housing and consequently the lever 14 cannot be slanted, thereby providing a locking device with reciprocal exclusion.

Finally, the types of taps delivering water into the chambers 400 and 401 may differ from those shown. In fact, use may be made, for example, of two simple screw-type taps whenever there are only two sources to be kept separate, or of two mixing taps whenever there are two sets of water to be kept separate, each made up of two freely mixable sources.

I claim:

1. A device for dispensing fluid through at least one delivery outlet, comprising:
   at least one first source for at least one first fluid;
   at least one second source for at least one second fluid;
   first flow control means operable between open and closed positions for controlling flow of said at least one first fluid from said at least one first source to said at least one delivery outlet;
   second flow control means operable between open and closed positions for controlling flow of said at least one second fluid from said at least one second source to said at least one delivery outlet;
   disenabling means comprising a first chamber for passage of said at least one first fluid between said first flow control means and said at least one delivery outlet, a second chamber for passage of said at least one second fluid between said second flow control means and said at least one delivery outlet; and
   flexible diaphragm means between said first and second chambers, so that when said first flow control means is operated to an open position thereof, pressure of said at least one first fluid in said first chamber displaces said flexible diaphragm means into a closed position for inhibiting the flow of said at least one second fluid from said second chamber to said at least one delivery outlet.

2. A device for dispensing fluid through at least one delivery outlet, comprising:
   at least one first source for at least one first fluid;
   at least one second source for at least one second fluid;
   first flow control means operable between open and closed positions for controlling flow of said at least one first fluid from said at least one first source to said at least one delivery outlet;
   second flow control means operable between open and closed positions for controlling flow of said at least one second fluid from said at least one second source to said at least one delivery outlet;
   disenabling means comprising a first chamber for passage of said at least one first fluid between said first flow control means and said at least one delivery outlet, a second chamber for passage of said at least one second fluid between said second flow control means and said at least one delivery outlet;
   flexible diaphragm means between said first and second chambers, so that when said first flow control means is operated to an open position thereof, pressure of said at least one first fluid in said first chamber displaces said flexible diaphragm means into a closed position for inhibiting the flow of said at least one second fluid from said second chamber to said at least one delivery outlet; and
   said at least one delivery outlet comprising second duct means having one end portion connected to said second chamber, and first duct means disposed coaxially within said second duct means and having one end portion passing through said second chamber and said diaphragm means and communicating with said first chamber.

3. A device for dispensing fluid through at least one delivery outlet, comprising:
   at least one first source for at least one first fluid;
   at least one second source for at least one second fluid;
   first flow control means operable between open and closed positions for controlling the flow of said at least one first fluid from said at least one first source to said at least one delivery outlet;
   second flow control means operable between open and closed positions for controlling flow of said at least one second fluid from said at least one second source to said at least one delivery outlet;
   disenabling means comprising a first chamber for passage of said at least one first fluid between said first flow control means and said at least one delivery outlet, a second chamber for passage of said at least one second fluid between said second flow control means and said at least one delivery outlet;
   flexible diaphragm means between said first and second chambers, so that when said first flow control means is operated to an open position thereof, pressure of said at least one first fluid in said first chamber displaces said flexible diaphragm means into a closed position for inhibiting the flow of said at least one second fluid from said second chamber to said at least one delivery outlet;
   valve means between said first chamber and said at least one delivery outlet movable between open and closed positions for controlling the flow of said first fluid; and valve setting means for setting said valve means to open at a predetermined pressure exceeding the pressure required in said first chamber to operate said flexible diaphragm means into said closed position thereof.

4. A device for dispensing fluid through at least one delivery outlet, comprising:
at least one first source for at least one first fluid;
at least one second source for at least one second fluid;
first flow control means operable between open and closed positions for controlling flow of said at least one first fluid from said at least one first source to said at least one delivery outlet;
second flow control means operable between open and closed positions for controlling flow of said at least one second fluid from said at least one second source to said at least one delivery outlet;
disenabling means operatively connected to at least said first flow control means for inhibiting flow of said at least one second fluid through said second flow control means when said first flow control means is in said open position thereof; and
said at least one delivery outlet comprising two separate coaxially extending ducts forming a single integrated delivery pipe means so that said flows of first and second fluids from said first and second flow control means, respectively, are prevented from mixing with each other.

5. Device as claimed in claim 4, characterized by the fact that said second means are operatively connected to further disenabling means inhibiting delivery from the first means when the second means are made to deliver water from their respective sources.

6. Device as claimed in claim 4, characterized by the fact that the disenabling means comprise a pin sliding axially against the action of a spring when the first means are actuated in order to shift to a position in which it interferes with the movement for actuating the second means, to prevent it from opening to deliver water.

7. Device as claimed in claim 6, characterized by the fact that the first means are operated by rotating a control lever having a cam surface over which one end of the pin slides during its axial sliding movement.

8. Device as claimed in claim 6, characterized by the fact that when the pin is in the interfering position, it has one end which prevents a lever controlling the second means from shifting to a delivery position.

9. Device as claimed in claim 8, characterized by the fact that the end of the pin which prevents the lever from shifting comprises an element constituting a wide surface which interferes with the shifting of said lever.

10. Device as claimed in claim 9, characterized by the fact that the wide interference surface comprises a portion shaped in the form of a semicircle so as to at least partially follow a rim covering the coupling of said lever and exert controlled interference thereon.

11. Device as claimed in claim 4, characterized by the fact that the disenabling means comprise a piston which is made to slide under the action of the flow of water from the first means into a first extreme position in which it obstructs the passage between the second means and the delivery outlet, and made to slide under the action of the flow of water from the second means into a second opposite extreme position in which it obstructs the passage between the first means and the delivery outlet.

12. Device as claimed in claim 11, characterized by the fact that the piston is biased by a spring towards one of said extreme positions.

13. Device as claimed in claim 4, characterized by the fact that the disenabling means comprise a shaft which slides axially to the movement of operation of the first means to bring cutoff elements in correspondence with flow passages in the second means.

14. Device as claimed in claim 4, characterized by the fact of comprising at least one selector device for selectively feeding a plurality of sources of water to an inlet of the delivery control means.

15. Device as claimed in claim 13, characterized by the fact that the selector device comprises circumferentially disposed apertures each of which is connected to a source, over said apertures being axially rotatable disposed a disk tightly closing the apertures and having a passage which can be selectively positioned, on rotation of the disk, over one of said apertures to put it in communication with an inlet duct of the control means.

16. Device as claimed in claim 13, characterized by the fact that the first means comprise a plug for closing the passage between the source and the delivery outlet operatively connected to the sliding shaft with the interposition of yielding elements, said sliding shaft being cam-operated by rotation of a control lever in order to shift the cutoff elements to the closed position before shifting the plug to the open position.

17. The device as claimed in claim 2 and further comprising:
a mouth on said one end portion of said second duct means communicating said second duct means with said second chamber;
said flexible diaphragm means engaging with and closing said mouth when in said closed position.

18. The device as claimed in claim 3 wherein:
an aperture is provided in said at least one delivery outlet through which said at least one first fluid flows;
said valve means comprises a piston slidably disposed in said at least one delivery outlet engageable with said aperture in said closed position of said valve means; and
said valve setting means comprises spring means resiliently urging said piston toward said closed position against the flow of said at least one first fluid.

19. The device as claimed in claim 4 wherein said single integrated delivery pipe means comprises:
a substantially horizontally oriented pipe means having an outlet end portion; and
a delivery head on said outlet end portion of said pipe means.

20. The device as claimed in claim 19 and further comprising:
means for rotatably mounting said delivery head on said outlet end portion for rotation about a substantially horizontal axis.

21. The device as claimed in claim 2 wherein said at least one delivery outlet comprises:
a substantially horizontally oriented pipe means having an outlet end portion; and
a delivery head on said outlet end portion of said pipe means.

22. The device as claimed in claim 21 and further comprising:

means for rotatably mounting said delivery head on said outlet end portion for rotation about a substantially horizontal axis.

23. The device as claimed in claim 1 wherein said at least one delivery outlet comprises:
a first fluid flow path having one end communicating with said first chamber; and
a second fluid flow path having one end communicating with said second chamber and being completely separate from said first fluid flow path to prevent mixing of said first and second fluids in said flow paths.

24. The device as claimed in 1, wherein said at least one delivery outlet comprises:
a substantially horizontally oriented pipe means having an outlet end portion; and
a delivery head on said outlet end portion of said pipe means.

25. The device as claimed in claim 24 and further comprising:
means for rotatably mounting said delivery head on said outlet end portion for rotation about a substantially horizontal axis.

26. The device as claimed in claim 1 wherein:
said first flow control means comprises a cut off tap having one inlet connected to a first source of said at least one first fluid.

27. The device as claimed in claim 1 wherein:
said second flow control means comprises a mixer tap having two inlets connected to two second sources of said at least one second fluid to facilitate mixing of two second fluids.

* * * * *